United States Patent
Yu

(10) Patent No.: US 8,554,417 B2
(45) Date of Patent: Oct. 8, 2013

(54) NARROW-FREQUENCY-BAND FEEDBACK CONTROL OF STEERING PINION TORQUE IN AN ELECTRIC POWER STEERING SYSTEM

(75) Inventor: Jinghong Yu, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 935 days.

(21) Appl. No.: 12/486,085

(22) Filed: Jun. 17, 2009

(65) Prior Publication Data

US 2010/0324784 A1  Dec. 23, 2010

(51) Int. Cl.
- B62D 5/04 (2006.01)
- B62D 6/00 (2006.01)
- G06F 19/00 (2011.01)
- G06F 17/00 (2006.01)

(52) U.S. Cl.
USPC .............................. 701/42; 701/30.4; 180/443

(58) Field of Classification Search
USPC .................... 701/1, 36, 41, 42, 43, 29.1, 30.4; 180/402, 443, 446, 400, 404
See application file for complete search history.

(56) References Cited

U.S. PATENT DOCUMENTS

| | | | |
|---|---|---|---|
| 4,614,248 A | 9/1986 | Kakinami et al. | |
| 5,732,373 A | 3/1998 | Endo | |
| 6,445,987 B1 | 9/2002 | Kurishige et al. | |
| 6,450,287 B1 | 9/2002 | Kurishige et al. | |
| 6,751,538 B2 | 6/2004 | Endo | |
| 6,847,876 B2 | 1/2005 | Tokumoto | |
| 6,863,150 B1 | 3/2005 | Tanaka et al. | |
| 6,929,085 B2 | 8/2005 | Sugitani | |
| 7,265,509 B2 | 9/2007 | Endo et al. | |
| 7,379,802 B2 | 5/2008 | Kasbarian et al. | |
| 2003/0182039 A1* | 9/2003 | Chandy | 701/43 |
| 2004/0162655 A1* | 8/2004 | Patankar | 701/41 |
| 2006/0106516 A1 | 5/2006 | Pick et al. | |
| 2006/0180369 A1* | 8/2006 | Brosig et al. | 180/190 |

* cited by examiner

Primary Examiner — Thomas Tarcza
Assistant Examiner — Edward Pipala
(74) Attorney, Agent, or Firm — Rankin, Hill & Clark LLP

(57) ABSTRACT

A narrow band feedback control system is provided to mitigate a disturbance within a predetermined bandwidth that is received by an electric power steering (EPS) system within a vehicle. A torque sensor calculates a torque value associated with the disturbance applied to the EPS system, the torque sensor outputs a torque signal related to the torque value. A filter receives the torque signal, filters the torque signal to the bandwidth associated with the external disturbance, and outputs a filtered torque signal. An amplifier receives the filtered torque signal, adjusts the gain of the filtered torque signal, and outputs a filtered, amplified torque signal. A logic module receives the filtered, amplified torque signal, generates a counter torque signal that is an inverse of the filtered, amplified torque signal and outputs the counter torque signal to the EPS system to mitigate the torque received from the external source.

20 Claims, 5 Drawing Sheets

(a) Steering pinion torque (b) Steering wheel acceleration (a) Steering pinion torque (b) Steering wheel acceleration NARROW-FREQUENCY-BAND FEEDBACK CONTROL OF STEERING PINION TORQUE IN AN ELECTRIC POWER STEERING SYSTEM

BACKGROUND

The present disclosure relates generally to electric power steering system and more particularly to narrow-frequency band feedback control of steering pinion torque associated therewith. It is to be appreciated, however, that the present disclosure may relate to other similar environments and applications.

In today's vehicles, electric power steering (EPS) is utilized to provide steering assistance based on particular vehicle dynamic conditions and maneuvers. In comparison with conventional hydraulic steering systems, an EPS system can provide safety enhancement by providing steering assistance during engine stall and ability to tune steering feel and performance. Further, an EPS system's electric motor is powered by the vehicle's alternator, instead of a hydraulic pump, which is belted into the engine. The efficiency advantage of an EPS system is derived from the fact that it is activated only when needed.

Development efforts have been made to gain favorable steering feel for various steering wheel input conditions in normal steering and handling areas which usually have a frequency range of steering input from zero to 2.5 Hz. External disturbance, which can be from an uneven or rough road surface, an unbalanced mass of tire or wheel, or break torque fluctuation, remains as a source to steering system which can cause unpleasant or annoying steering feel. Existing technologies utilize either a mechanical device to detect the source of steering torque or control logic to stabilize the torque sensor system to define bands of disturbance, which are used for motor current control. However, the frequency bands of common external disturbances to the steering system, such as steering shimmy caused by tire wheel unbalance, brake judder caused by breaking torque fluctuation, and kickback from uneven road surfaces, are much higher than normal steering and handling frequencies (e.g., greater than 2.5 Hz). Furthermore, these kinds of disturbances are all directly sensed by a steering pinion torque sensor and hence the steering signal. Conventional countermeasures to suppress such external disturbances are implemented via chassis sensitivity and receiver attenuation. However, simpler and more cost efficient approaches are desired.

SUMMARY

According to one aspect, a narrow band feedback control system is provided to mitigate a disturbance within a predetermined bandwidth that is received by an electric power steering (EPS) system within a vehicle. A torque sensor calculates a torque value associated with the disturbance applied to the EPS system, the torque sensor outputs a torque signal related to the torque value. A filter receives the torque signal, filters the torque signal to the bandwidth associated with the external disturbance, and outputs a filtered torque signal. An amplifier receives the filtered torque signal, adjusts the gain of the filtered torque signal, and outputs a filtered, amplified torque signal. A logic module receives the filtered, amplified torque signal, generates a counter torque signal that is an inverse of the filtered, amplified torque signal and outputs the counter torque signal to the EPS system to mitigate the torque received from the external source.

According to a further aspect, a computer implemented method is employed to mitigate external disturbances experienced by an electric power steering (EPS) system within a vehicle via feedback control. A disturbance to an EPS motor pinion within the EPS system is received, the disturbance being within a predetermined bandwidth. Torque applied to the EPS motor pinion from the external disturbance is calculated to create a pinion torque signal. The pinion torque signal is filtered to the predetermined bandwidth and the filtered pinion torque signal is amplified. A counter torque signal is generated based at least in part upon the pinion torque signal. The external disturbance is mitigated by applying the counter torque signal to the EPS motor.

In another aspect, a feedback control system mitigates a disturbance within a bandwidth received by an electric power steering (EPS) system within a vehicle. A torque sensor calculates a torque value associated with the disturbance applied to the EPS system and outputs a torque signal related to the torque value. A filter filters the torque signal to the bandwidth associated with the external disturbance, the signal output is a filtered torque signal. An amplifier adjusts the gain of the filtered torque signal, the signal output is a filtered, amplified torque signal. A logic module receives the filtered, amplified torque signal, generates a counter torque signal that is an inverse of the filtered, amplified torque signal and outputs the counter torque signal to the EPS system to mitigate the torque received from the external source.

BRIEF DESCRIPTION OF THE DRAWINGS

FIG. 3(a) is an exemplary waveform for a steering pinion torque signal when electric power steering is on.

FIG. 3(b) is an exemplary waveform for a steering wheel acceleration signal when electric power steering is on.

DETAILED DESCRIPTION

Figure 1:
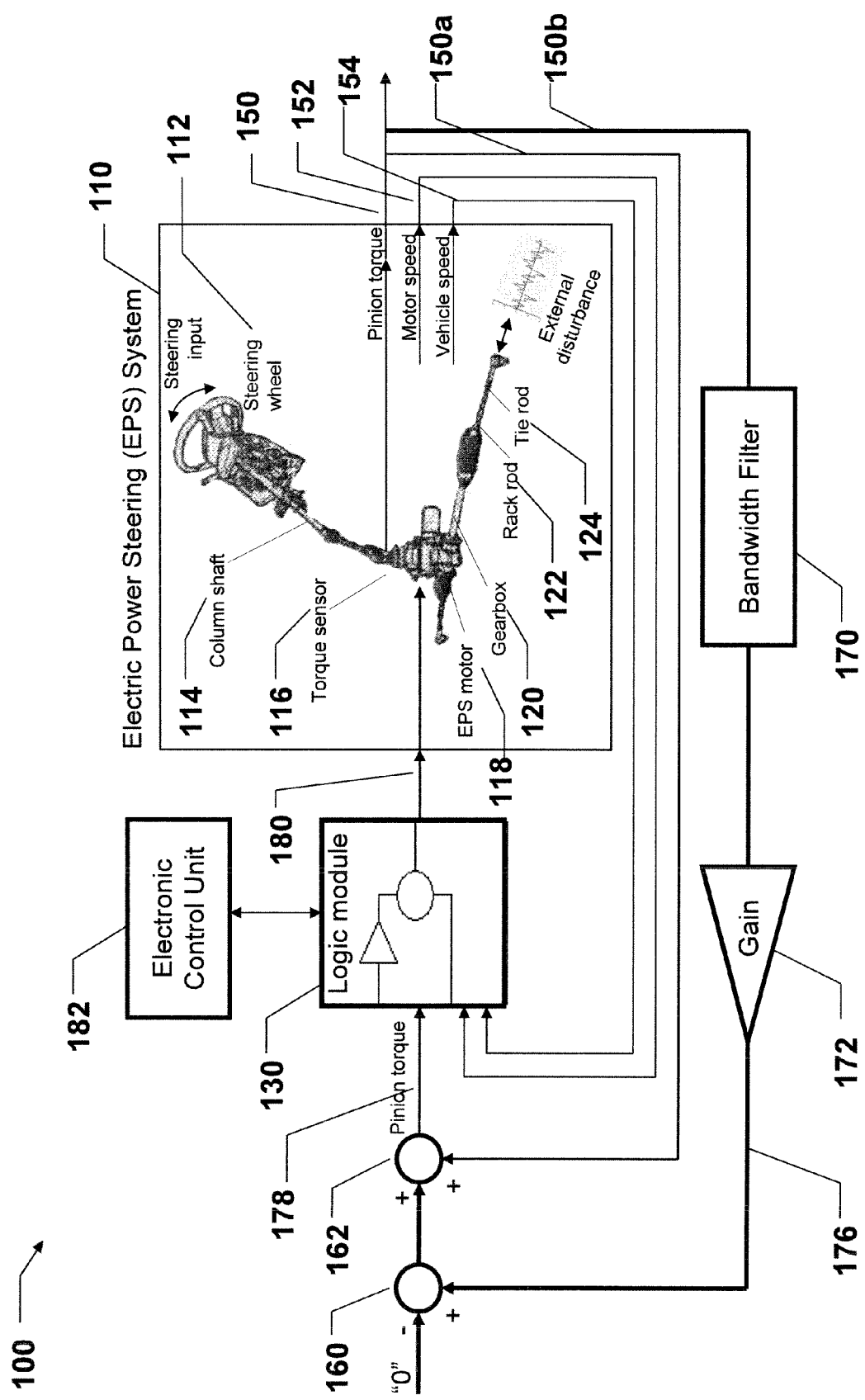
FIG. 1 illustrates a feedback control system to mitigate torque from external sources within an appropriate narrow-frequency band.

Referring now to the drawings wherein the showings are for purposes of illustrating one or more embodiments only and not for purposes of limiting the same, FIG. 1 illustrates a narrow frequency feedback control system 100 for an electric power steering (EPS) system 110. In order to overcome the drawbacks of conventional external disturbance suppression, the feedback control system 100 is utilized to mitigate torque caused by external disturbances to electric power steering systems. In this manner, steering vibration toughness is enhanced by targeting a zero pinion torque oscillation or variation and a specified narrow frequency band, without influence on a normal steering and handling frequency range. The feedback controller can be included either as an add-on physical electrical circuit or via software executed by a logic module 130 utilizing digital narrow bandwidth filtering.

The EPS system 110 includes a steering wheel 112 coupled to a rack rod 122 via a column shaft 114. The rack rod 122 is connected to a wheel (not shown) via a tie rod 124. The wheel is turned commensurate with the rotation of the column shaft 114 as input by the steering wheel 112 via the rack rod 122 and the tie rod 124. A gearbox 120 determines the steering ratio and angle of rotation between the steering wheel 112 and the wheel. An EPS motor 118 receives information from a torque sensor 116 to determine the amount of steering assist to apply to the EPS system 110. In one embodiment, the column shaft 114 has an input shaft (not shown) from the steering wheel 112 to the torque sensor 116 and an output shaft (not shown) from the torque sensor 116 to a steering shaft coupler (not shown). The input and output shafts are separated by a torsion bar (not shown), where the torque sensor 116 is located. The torque sensor 116 can include a compensation coil, a detecting coil, and three detecting rings (not shown).

The detecting rings can have toothed edges that face each other. A first detecting ring can be fixed to the output shaft, whereas a second and a third detecting ring can be fixed to the input shaft. The detecting coil is positioned around the toothed edges of the first and second detecting rings. As torque is applied to the column shaft 114, the alignment of the teeth between the first and second detecting rings changes, which causes the detecting coil signal voltage to change. Alternatively or in addition, torque can be applied from an external source as caused by a wheel imbalance or a rough road surface, for example. The EPS motor 118 recognizes the change in signal voltage as steering column shaft torque. In this manner, when the steering wheel 112 is turned and/or external disturbances input, a pinion torque signal 150 from the torque sensor 116 relates to the amount of torque applied to the column shaft 114.

A motor speed signal 152 and a vehicle speed signal 154 are received unchanged by the logic module 130. The pinion torque signal 150 is split into two signals 150a and 150b to provide appropriate feedback for the EPS system 110. The signal 150a is received unchanged by a summing node 162. The signal 150b is filtered, through a narrow frequency band filter 170, and amplified, through an amplifier 172, to become a signal 176 that is received by a summing node 160 and added to the signal 150a at the summing node 162. The signals 150a and 176 are summed to create a pinion torque signal 178 that is input into the logic module 130.

The purpose of amplifying the signal 150b is to accelerate the reaction time of the counter torque generated by the motor and hence speed up the convergence of the steering pinion torque variation to a zero target within a predetermined frequency range. In one example, the gain applied by the amplifier 172 to the signal 150b can be determined by actual on-car tuning or simulation to achieve a desirable attenuation of steering wheel rotational vibrations. Disturbances received by the torque sensor 116 are minimized or eliminated via the logic module 130 by producing a counter torque signal 180 that negates such disturbances without influence on a normal steering and handling frequency range. The counter torque signal 180 is limited to a particular frequency range that is related to the external forces via the narrow frequency band filter 170.

The logic module 130 can be a hardware or software component that generates the counter torque signal 180 to compensate for external disturbances to the EPS system 110. The logic module 130 receives motor speed, vehicle speed, and pinion torque information via the motor speed signal 152, the vehicle speed signal 154, and the pinion torque signal 178 respectively. This information can be processed via an algorithm to generate an appropriate counter torque signal 180 to negate the pinion torque received by the EPS system 110 from one or more external sources. A lookup table (not shown) can be employed for storage and retrieval of signal generation data associated with particular circumstances. For instance, a particular motor speed coupled with a particular vehicle speed can relate to a counter torque signal with a predetermined window for gain and/or bandwidth.

An electronic control unit (ECU) 182 illustrates one possible hardware configuration to support the execution of commands within the logic module 130. Alternatively or in addition, the ECU 182 supports the entire narrow frequency feedback control system 100. In yet another embodiment, the ECU 182 is utilized for the execution of commands within a method, such as method 500 below. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The ECU 182 can include an input circuit having the functions of shaping the waveforms of input signals from the various sensors including the ones mentioned above, shifting the voltage levels of sensor output signals to a predetermined level, converting analog signals from analog-output sensors to digital signals, and so forth. The ECU 182 can also include a central processing unit (CPU), a memory circuit storing various operational programs which are executed by the CPU, and for storing results of calculations from the CPU, etc., and an output circuit.

The ECU 182 can also include a system bus that couples various system components including the system memory to the processing unit. The processing unit can be any of various commercially available processors. Dual microprocessors and other multi-processor architectures also can be used as the processing unit. The system bus can be any of several types of bus structure including a memory bus or memory controller, a peripheral bus, and a local bus using any of a variety of commercially available bus architectures. The ECU 182 memory includes read only memory (ROM) and random access memory (RAM). A basic input/output system (BIOS), containing the basic routines that help to transfer information between elements within the ECU 182, such as during start-up, is stored in ROM.

The ECU 182 can further include a hard disk drive, a magnetic disk drive, e.g., to read from or write to a removable disk, and an optical disk drive, e.g., for reading a CD-ROM disk or to read from or write to other optical media. The ECU 182 typically includes at least some form of computer readable media. Computer readable media can be any available media that can be accessed by the ECU 182. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the ECU 182.

A number of program modules may be stored in the drives and RAM, including an operating system, one or more application programs, other program modules, and program non-interrupt data. The operating system in the ECU 182 can be any of a number of commercially available operating systems.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

The lower and upper cutoff frequencies of the bandwidth filter 170 can be selected according to the nature of the external disturbances. For instance, in the case of steering vibration caused by brake torque fluctuation, tire wheel assembly imbalance and/or kickback from a rough road surface, the frequency range of the external disturbance is normally between 12-20 Hz. In this case, a frequency range of 10-25 Hz for the narrow frequency band setting is adequate, which is well above the conventional steering and handling frequency range of 0-2.5 Hz. Therefore, the addition of the narrow frequency feedback has no significant effect on the function of the electric power and steering system for normal steering and handling performance.

An amplifier 172 amplifies the pinion torque signal 150*b* to accelerate reaction time of the feedback control system 100 to quickly target and counteract external disturbances received by a steering system, without influence on normal steering and handling. The gain for the narrow frequency band steering torque feedback is used to amplify the steering torque signal sensed from external disturbances. In one embodiment, the gain for the narrow-frequency band steering torque feedback is determined by vehicle tuning or simulation to achieve desirable attenuation of steering wheel rotational vibrations.

A simulation can be employed to verify the effectiveness of feedback control to negate torque via the counter torque signal 180. In one simulation, models for a vehicle chassis system with electric power steering are used to replace equivalent hardware. In addition, a simulation model for the control algorithm described herein is used to replace a conventional electric control unit (ECU). An amplifier and a bandwidth filter are used to create the amplified narrow frequency band feedback control of steering pinion torque. As the simulated external disturbance, frequency sweep forces are added to a left side spindle to excite a chassis system. The forces have constant amplitudes and the frequency is swept from 15-19 Hz in four seconds. Pinion torque and acceleration in the circumferential direction at a point on the steering wheel rim are monitored.

Figure 2:
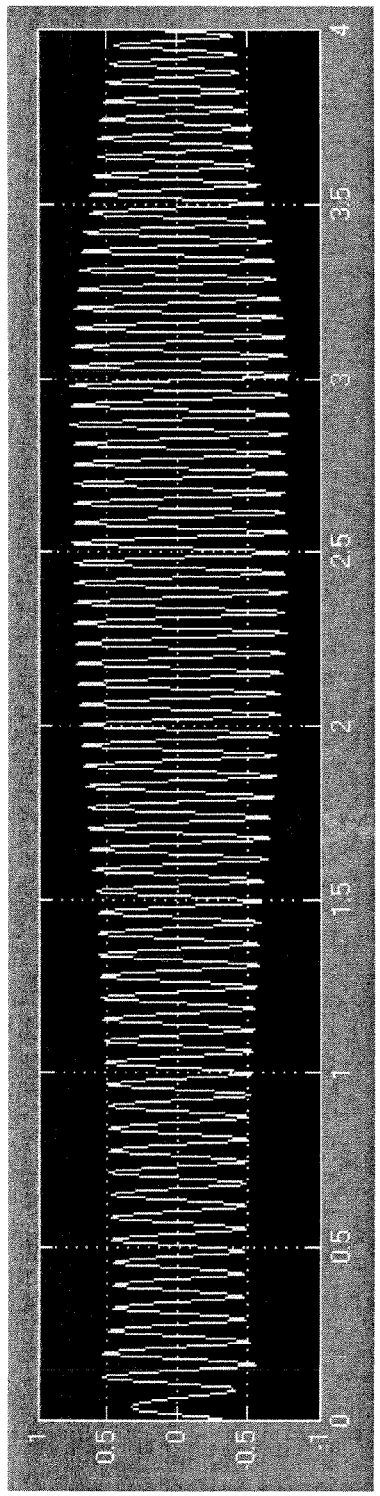
FIG. 2(a) is an exemplary waveform for a steering pinion torque signal when electric power steering is off.
FIG. 2(b) is an exemplary waveform for a steering wheel acceleration signal when electric power steering is off.
Figure 2:
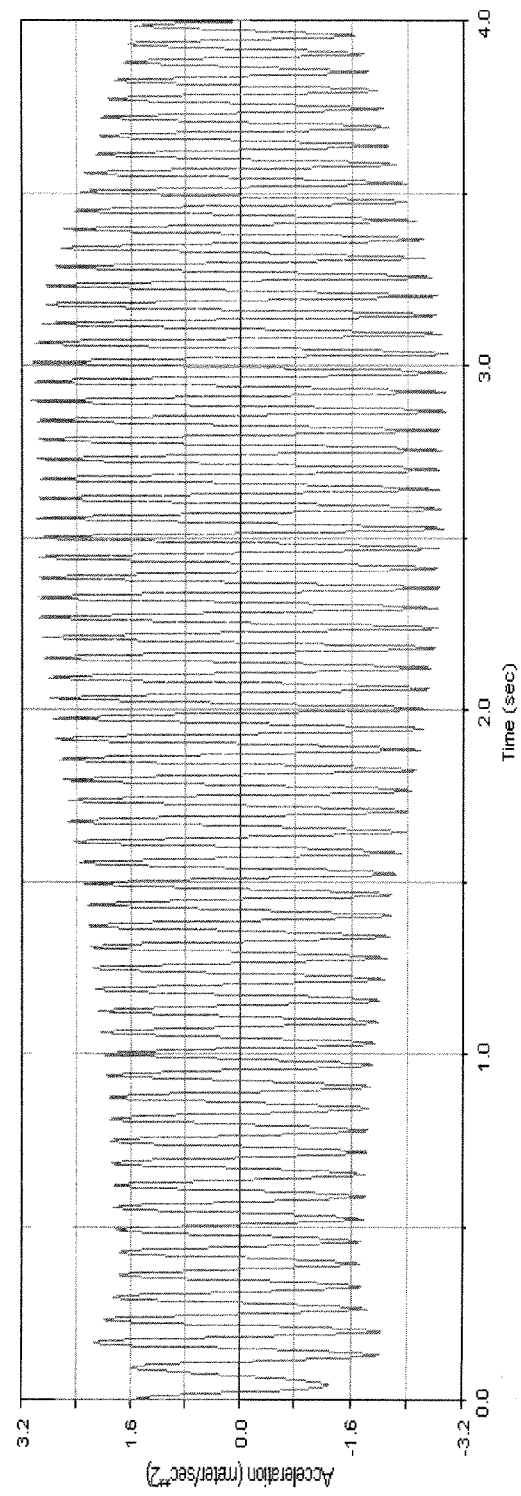
Figure 3:
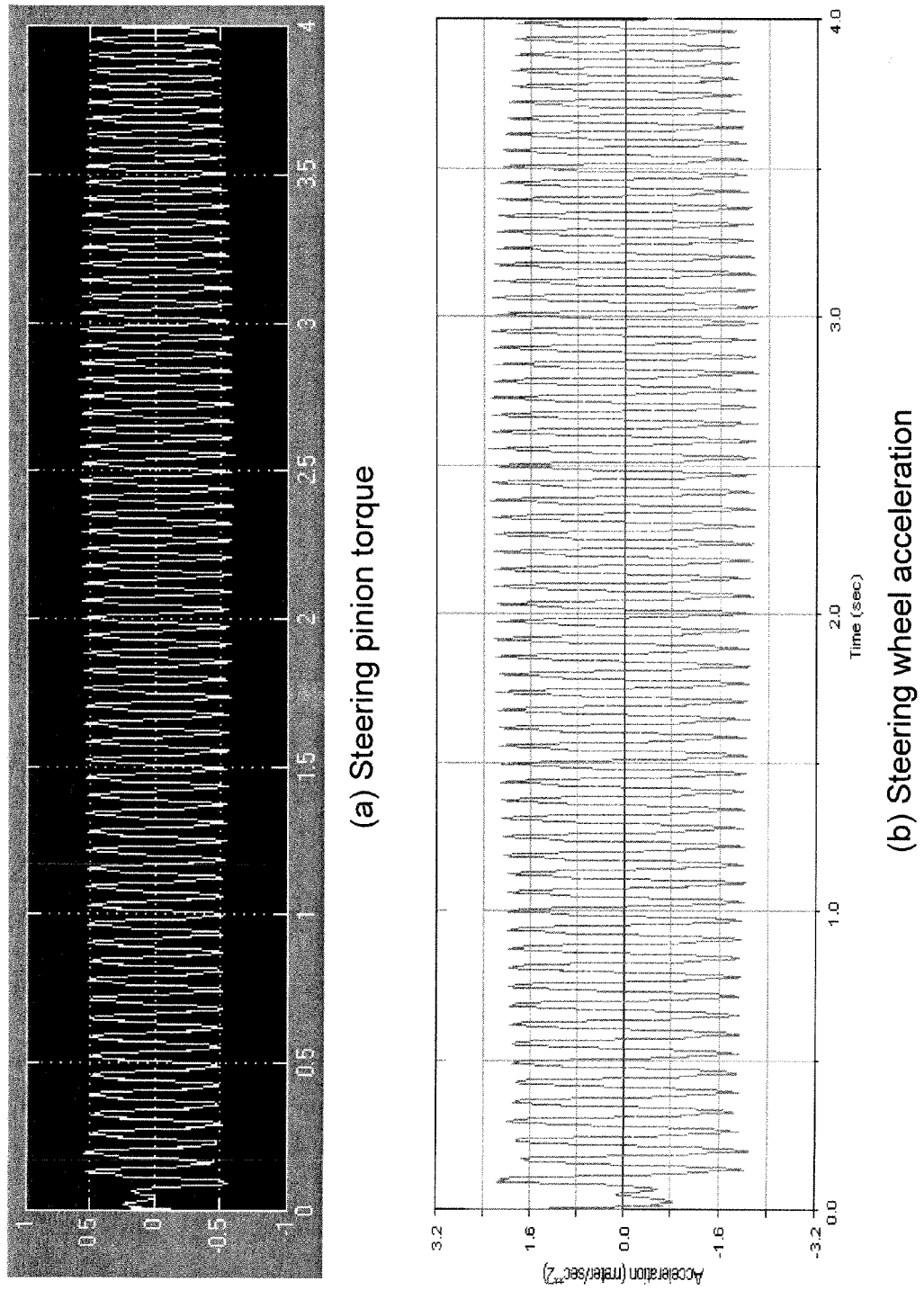
Figure 4:
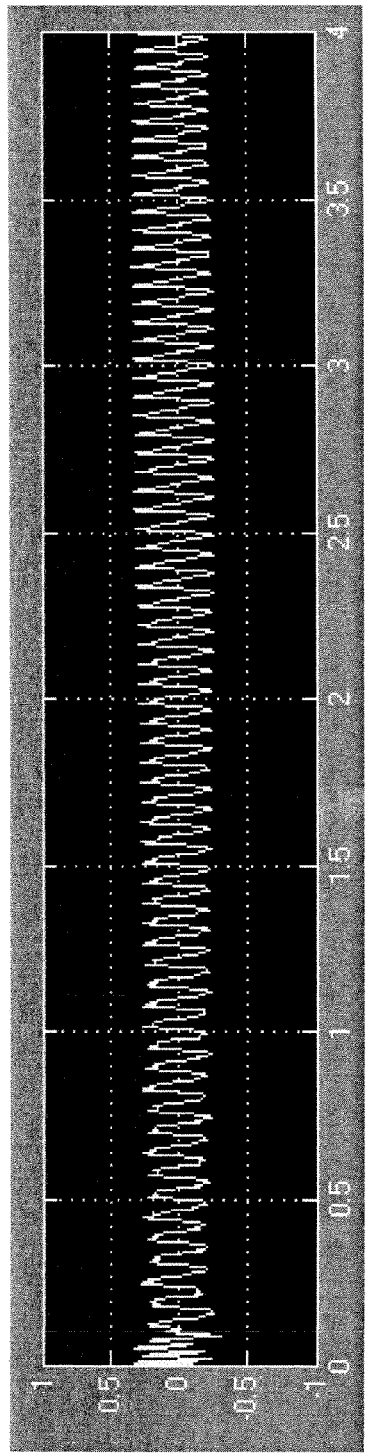
FIG. 4(a) is an exemplary waveform for a steering pinion torque signal when electric power steering is on with narrow-frequency band steering torque feedback.
FIG. 4(b) is an exemplary waveform for a steering wheel acceleration signal when electric power steering is on with narrow-frequency band steering torque feedback.
Figure 4:
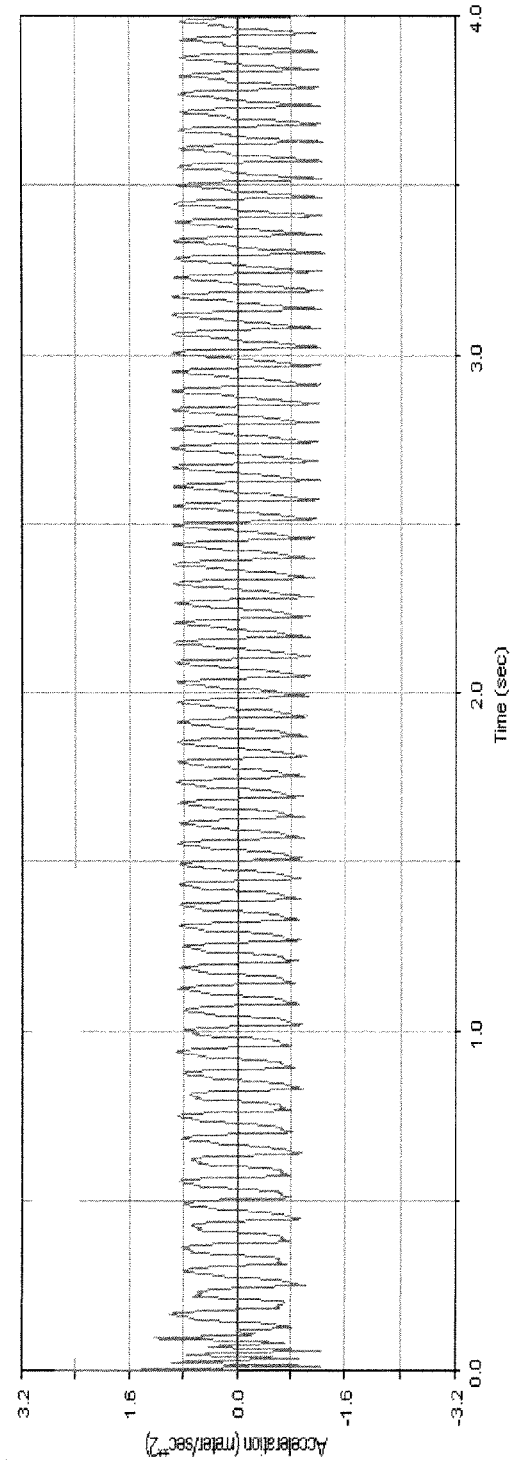

FIGS. 2-4 illustrate exemplary signal waveforms that result from this simulation in three disparate scenarios. FIG. 2 shows the results of pinion torque and steering wheel acceleration when the power of the electric power steering is turned off. In this example, the chassis system demonstrates a resonance at approximately 17.5 Hz. Peak acceleration is about 3 m/s$^2$. After power is turned on to the electric power steering control system with an original control setting, the steering wheel acceleration is slightly reduced to 2.3 m/s$^2$ from 3 m/s$^2$, as shown in FIG. 3. However, when adding the narrow-frequency-band feedback control system described herein, the peak value of the steering wheel vibration is reduced by about 56% to 1.3 m/s$^2$ from 3 m/s$^2$, as shown in FIG. 4.

Figure 5:
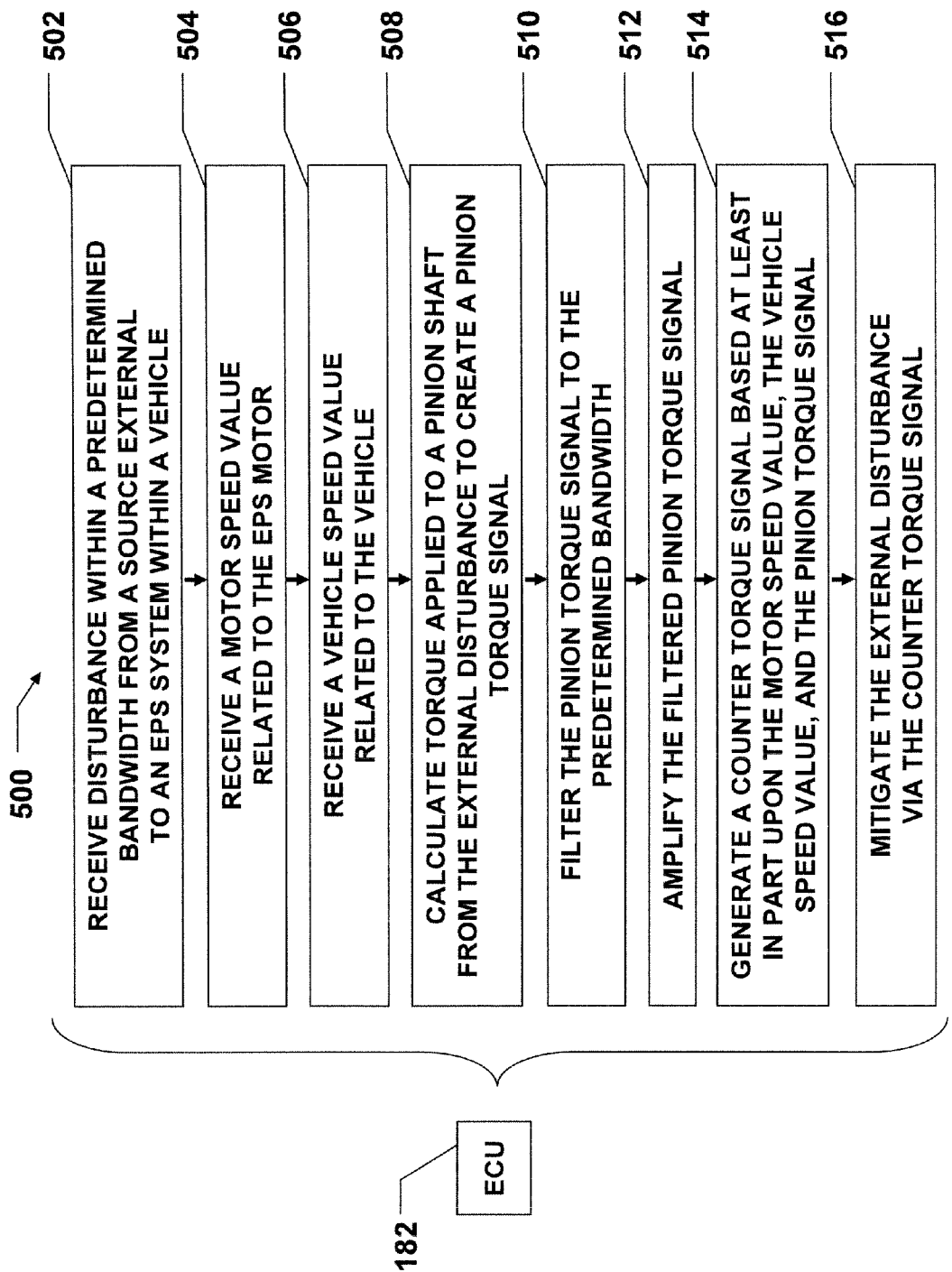
FIG. 5 is a method to mitigate external disturbances received by an EPS steering system.

FIG. 5 illustrates a method 500 to mitigate external disturbances experienced by an EPS steering system. At reference numeral 502, a disturbance within a predetermined bandwidth is received from a source external to an EPS motor within a vehicle. The predetermined bandwidth can be related to particular disturbances such as brake torque fluctuation or tire-wheel assembly imbalance. In one embodiment, the bandwidth associated with such disturbances is 12-20 Hz. At 504, a motor speed value related to the EPS motor is received. The motor speed can be associated with the amount of steering assistance provided to the steering assembly. At 506, a vehicle speed value is received that is related to the vehicle.

At 508, torque applied to the pinion from the external disturbance is calculated to create a pinion torque signal. The motor speed, vehicle speed and pinion torque are used to determine how to adjust the EPS system to assist with steering and to counteract external disturbances. In this manner, a driver of the vehicle will be unaware of such disturbances. At 510, the pinion torque signal is filtered within the predetermined bandwidth. At 512, the pinion torque signal filtered at 510 is amplified. At 514, a counter torque signal is generated based at least in part upon the motor speed value, the vehicle speed value and the pinion torque signal. In one example, the counter torque signal is an inverse of the pinion torque signal. In another example, the counter torque signal is 180 degrees out of phase with the pinion torque signal. Regardless of form, the counter torque signal is employed to negate the torque received from the external disturbance at 516. Since the pinion torque signal is filtered and amplified, feedback control of the EPS system can occur in a focused manner with a minimal response time. In one example, the counter torque signal is set to converge the function pinion torque variation to zero.

The exemplary embodiment has been described with reference to the embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A narrow band feedback control system to mitigate a disturbance within a predetermined bandwidth that is received by an electric power steering (EPS) system within a vehicle, comprising
    a torque sensor that calculates a torque value associated with the disturbance applied to the EPS system, the torque sensor outputs a torque signal related to the torque value;
    a filter that receives the torque signal, filters the torque signal to the bandwidth associated with the external disturbance, and outputs a filtered torque signal;
    an amplifier that receives the filtered torque signal, adjusts the gain of the filtered torque signal, and outputs a filtered, amplified torque signal; and
    a logic module that receives the filtered, amplified torque signal, generates a counter torque signal that is an inverse of the filtered, amplified torque signal and outputs the counter torque signal to the EPS system to mitigate the torque received from the external source.

2. The narrow band feedback control system according to claim 1, further including:
    at least one wheel that facilitates motion of the vehicle on a roadway;

a steering wheel that turns the at least one wheel on the roadway commensurate with rotation of the steering wheel;

a column shaft that couples the steering wheel to the at least one wheel;

a torque sensor that calculates a torque applied to the column shaft from at least one of the steering wheel, the roadway, and a source external to the EPS system; and an EPS motor that assists rotation of the column shaft based at least in part on the torque calculated by the torque sensor.

3. The narrow band feedback control system according to claim 1, wherein the torque signal is divided into a first torque signal and a second torque signal, the first torque signal is unchanged prior to receipt by the logic module, the second torque signal is filtered and amplified prior to receipt by the logic module.

4. The narrow band feedback control system according to claim 3, wherein the logic module processes the first torque signal, the second torque signal, a motor speed value, and a vehicle speed value via an algorithm, the algorithm identifies the waveform associated with both the first torque signal and the second torque signal in view of the motor speed and the vehicle speed to generate the counter torque signal.

5. The narrow band feedback control system according to claim 3, wherein the first torque signal is summed to the second torque signal before it is received by the logic module.

6. The narrow band feedback control system according to claim 1, wherein the counter torque signal is at least one of an inverse of the pinion torque signal and 180 degrees out of phase to the pinion torque signal.

7. The narrow band feedback control system according to claim 1, wherein the predetermined bandwidth is related to at least one of a brake torque fluctuation, a tire wheel assembly imbalance and/or a kickback from a roadway surface.

8. The narrow band feedback control system according to claim 1, wherein the predetermined bandwidth is about 10-25 Hz.

9. The narrow band feedback control system according to claim 1, wherein the counter torque signal is generated to converge variation of torque applied to the pinion shaft to zero.

10. The narrow band feedback control system according to claim 1, wherein the logic module transmits the counter torque signal to the EPS motor to mitigate torque associated with the external disturbance.

11. A computer implemented method to mitigate external disturbances experienced by an electric power steering (EPS) system within a vehicle via feedback control, comprising:

receiving a disturbance to a pinion shaft within the EPS system, the disturbance is within a predetermined bandwidth;

calculating torque applied to the pinion shaft from the external disturbance to create a pinion torque signal;

filtering the pinion torque signal to the predetermined bandwidth;

amplifying the filtered pinion torque signal;

generating a counter torque signal based at least in part upon the pinion torque signal; and mitigating the external disturbance by applying the counter torque signal to the EPS motor.

12. The method of claim 11, further including:

receiving a motor speed value related to the EPS motor; and receiving a vehicle speed value related to the vehicle.

13. The method of claim 12, wherein the motor speed value and the vehicle speed value are utilized to generate the counter torque signal.

14. The method of claim 11, wherein the counter torque signal is at least one of an inverse of the pinion torque signal and 180 degrees out of phase to the pinion torque signal.

15. The method of claim 11, wherein the predetermined bandwidth is related to at least one of a brake torque fluctuation, a tire wheel assembly imbalance and/or a kickback from a rough road surface.

16. The method of claim 11, wherein the predetermined bandwidth is about 10-25 Hz.

17. The method of claim 11, wherein the counter torque signal reduces a peak acceleration value associated with the pinion torque signal by around 50%.

18. The method of claim 11, wherein the counter torque signal is generated to converge variation of torque applied to the pinion shaft and hence the column shaft to a zero value.

19. A feedback control system to mitigate a disturbance within a bandwidth received by an electric power steering (EPS) system within a vehicle, comprising:

a torque sensor that calculates a torque value associated with the disturbance applied to the EPS system, the torque sensor outputs a torque signal related to the torque value;

a filter that filters the torque signal to the bandwidth associated with the external disturbance, the signal output is a filtered torque signal;

an amplifier that adjusts the gain of the filtered torque signal, the signal output is a filtered, amplified torque signal; and a logic module that receives the filtered, amplified torque signal, generates a counter torque signal that is an inverse of the filtered, amplified torque signal and outputs the counter torque signal to the EPS system to mitigate the torque received from the external source.

20. The method of claim 19, wherein the predetermined bandwidth is related to at least one of a brake torque fluctuation, a tire wheel assembly imbalance and/or a kickback from a rough road surface, the predetermined bandwidth is about 10-25 Hz.

* * * * *